(12) United States Patent
Jin et al.

(10) Patent No.: US 9,580,518 B2
(45) Date of Patent: Feb. 28, 2017

(54) METHOD FOR FRACTIONATING DEXTRIN

(71) Applicant: Jiangnan University, Wuxi (CN)

(72) Inventors: Zhengyu Jin, Wuxi (CN); Yaoqi Tian, Wuxi (CN); Xiuting Hu, Wuxi (CN); Binghua Sun, Wuxi (CN); Bao Zhang, Wuxi (CN); Benxi Wei, Wuxi (CN); Chunsen Wu, Wuxi (CN); Na Yang, Wuxi (CN); Xueming Xu, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 14/903,240

(22) PCT Filed: Sep. 26, 2014

(86) PCT No.: PCT/CN2014/087501
§ 371 (c)(1),
(2) Date: Jan. 6, 2016

(87) PCT Pub. No.: WO2016/041219
PCT Pub. Date: Mar. 24, 2016

(65) Prior Publication Data
US 2016/0222136 A1 Aug. 4, 2016

(30) Foreign Application Priority Data
Sep. 17, 2014 (CN) .......................... 2014 1 0473784

(51) Int. Cl.
*C08B 30/18* (2006.01)
(52) U.S. Cl.
CPC ................................... *C08B 30/18* (2013.01)
(58) Field of Classification Search
CPC ..................................................... C08B 30/18
USPC ........................................ 536/103, 124, 127
See application file for complete search history.

(56) References Cited

PUBLICATIONS

Xiuting Hu et al.; "Interaction Between Amylose and 1-Butanol during 1-Butanol-Hydrochloric Acid Hydrolysis of normal rich starch"; International Journal of Biological Macromolecules, vol. 61 (2013), pp. 329-332.
Greta G. Gelders et al.; "Fractionation of Starch Hydrolysates into Dextrins with Narrow Molecular Mass Districution and their detection by high-performance anion-exchange Chromatography with pulse Amperometric Detection"; Journal of Chromatography A, vol. 992 (2003), pp. 75-83.
Eric Bertoft and Lisa Spoof; "Fractional Precipitation of Amylopectin Alpha-Dextrins Using Methanol"; Carbohydrate Research, vol. 189 (1989), pp. 169-180.
I. Defloor et al.; "Fractionation of maltodextrins by ethanol"; Journal of Chromatography A, vol. 803 (1998), pp. 103-109.
Xiuting Hu et al.; "Hydrolysis Process of normal rice starch by 1-butanol-hydrochloric acid"; Food Hydrcolloids, vol. 41 (2014), pp. 27-32.
Arno Max Basedow and Klaus Heinrich Ebert; "Production, Characterization, and Solution Properties of Dextran Fractions of Narrow Molecular Weight Distributions"; Journal of Polymer Science: Polymer Symposium 66 (1979), pp. 101-115, John Wiley & Sons, Inc.
Jing-Wen Sun et al.; "Study on the Preparation and Characteristics of Modified Cassava Starch Dextrin"; Modern Food Science and Technology (2007), vol. 23, No. 10.
Hai-Rong Bao, Zao Wang; "Properties of Corn Amylodextrins prepared in acid-alcohol media"; Journal of Shanghai Fisheries University, vol. 12, No. 1, Mar. 2003.

*Primary Examiner* — Sudhakar Katakam
*Assistant Examiner* — Everett White
(74) *Attorney, Agent, or Firm* — Wang Law Firm, Inc.

(57) ABSTRACT

A method for fractionating dextrin, belonging to the technical field of food processing. In principle, the method for fractionating dextrin of the present invention is based on the fact that the dextrin is incompatible with polyethylene glycol in aqueous solution and a larger molecular weight of the dextrin results in more significant incompatibility with polyethylene glycol. Accordingly, the stepwise precipitation of dextrin components having a molecular weight from large to small may be realized by gradually increasing the concentration of polyethylene glycol by gradually adding polyethylene glycol to dextrin in aqueous solution.

3 Claims, No Drawings

METHOD FOR FRACTIONATING DEXTRIN

TECHNICAL FIELD OF THE INVENTION

The present invention discloses a method for fractionating dextrin, relating to the application of the technology of stepwise precipitation with polyethylene glycol in fractionating dextrin, belonging to the technical field of food processing.

BACKGROUND OF THE INVENTION

At present, as a method for fractionating dextrin, there are mainly a fractionating method by exclusion chromatography and a fractionating method by precipitation with alcohol. The former is costly due to expensive fillers and expensive chromatographic power systems (i.e., pumps). Additionally, by the fractionating method by exclusion chromatography, it is difficult to realize industrial production due to small capacity. The fractionating method by precipitation with alcohol has the following disadvantages: it is likely to have local co-precipitation during the addition of alcohol thus to cause poor fractionation effect; the decrease in concentration of the dextrin due to the increase in total volume of the dextrin solution during the addition of alcohol results in low yield of dextrin; and the fractionating process highly depends upon the ambient temperature and the repeatability is thus low.

In view of this, the present invention is to provide a novel method for fractionating dextrin and thus to provide a novel method for preparing low-dispersity dextrin. It has been found in the present invention that dextrin is incompatible with polyethylene glycol in aqueous solution and a larger molecular weight of the dextrin results in more significant incompatibility with polyethylene glycol. Accordingly, the stepwise precipitation of dextrin components having a molecular weight from large to small may be realized by gradually increasing the concentration of polyethylene glycol by gradually adding polyethylene glycol to dextrin in aqueous solution. On this basis, the present invention establishes a novel method for fractionating dextrin, which is named "stepwise precipitation method for fractionating dextrin by polyethylene glycol".

SUMMARY OF THE INVENTION

An objective of the present invention is to provide a method for fractionating dextrin.

The present invention employs the following technical solution: a method for fractionating dextrin is provided, for the purpose of fractionating dextrin by the stepwise precipitation technology by polyethylene glycol, specifically:

1. preparation of dextrin solution: dispersing 15-25 g of tapioca starch in 100 mL of n-butyl alcohol, adding 1 mL of concentrated hydrochloric acid, hydrolyzing for 3 days at 40° C., adding 14 mL of 1M $NaHCO_3$ to terminate the reaction, centrifuging for 15 min at 4000 g, precipitating, washing with 50% ethanol solution for several times until there is no chloride ion, drying in an oven at 40° C., crushing, and sieving to obtain the dextrin; and the dextrin is dissolved in the distilled water to prepare a dextrin solution at a concentration of 0.9%-3.6%;

2. stepwise precipitation by polyethylene glycol for fractionating: adding 5 g of polyethylene glycol to 100 mL of dextrin solution at a mass concentration of 0.9%-3.6%, stirring while heating until the polyethylene glycol is dissolved, that is, the solution becomes clear, naturally cooling in air to 25° C., remaining at 25° C. in a water bath for 24 h, centrifuging for 15 min at 4000 g if any precipitation occurs, washing the obtained precipitate with trichloromethane to remove the residual polyethylene glycol, drying for 24 h at 40° C., crushing and sieving to obtain a dextrin component Fraction 1; continuously adding 5 of polyethylene glycol to the supernatant, and repeating the above processes to obtain a dextrin component Fraction 2; if no precipitation occurs, continuously adding 5 g of polyethylene glycol until the precipitation occurs; and repeating the above processes until the amount of polyethylene glycol added reaches 60 g, thus to obtain 9 to 12 graded dextrin components; and 3. Identification about dispersity of dextrin: the dextrin components are analyzed by high-efficiency exclusion chromatography by a multi-angle laser detector and a differential detector, to calculate the molecular weight and coefficient of dispersion of dextrin.

The polyethylene glycol is polyethylene glycol having a number-average molecular weight of 4000 Da, 6000 Da or 8000 Da.

The present invention has the beneficial effects of simple production process, low cost, high yield, large capacity and good grading effect compared with the prior art.

DETAILED DESCRIPTION OF THE INVENTION

Embodiment 1

25 g of tapioca starch was dispersed in 100 mL of n-butyl alcohol (analytically pure), added with 1 mL of concentrated hydrochloric acid (analytically pure), hydrolyzed for 72 h at 40° C., added with 14 mL of 1M $NaHCO_3$ to terminate the reaction, centrifuged for 15 min at 4000 g, precipitated, washed with 50% ethanol solution for several times until there was no chloride ion, and dried for 24 h in an oven at 40° C. to obtain the dextrin. The dextrin was dissolved in the distilled water to prepare a dextrin solution at a concentration of 3.6%. 5 g of polyethylene glycol (analytically pure) having a number-average molecular weight of 8000 Da was added to 100 mL of dextrin solution, stirred while heating until the polyethylene glycol was dissolved, that is, the solution became clear, naturally cooled in air to 25° C., remained at 25° C. in a water bath for 24 h, and centrifuged for 15 min at 4000 g; the resulting concentrated phase was washed with trichloromethane to remove the residual polyethylene glycol, dried for 24 h at 40° C., crushed and sieved to obtain a dextrin component Grade 1; 5 g of polyethylene glycol was continuously added to the supernatant, and the above processes were repeated until the amount of polyethylene glycol added reached 60 g, thus to obtain 11 graded dextrin components. The dextrin products were analyzed by high-efficiency exclusion chromatography by a multi-angle laser detector and a differential detector. The respective molecular weight of the 11 dextrin components is shown as follows:

Dextrin 1 (when added with 5 g of polyethylene glycol): weight-average molecular weight: $2.380 \times 10^4$ Da; and coefficient of dispersion: 1.38;

Dextrin 2 (when added with 10 g of polyethylene glycol): weight-average molecular weight: $2.1660 \times 10^4$ Da; and coefficient of dispersion: 1.13;

dextrin 3 (when added with 15 g of polyethylene glycol): weight-average molecular weight: $2.011 \times 10^4$ Da; and coefficient of dispersion: 1.16;

dextrin 4 (when added with 20 g of polyethylene glycol): weight-average molecular weight: $1.879 \times 10^4$ Da; and coefficient of dispersion: 1.21;

dextrin 5 (when added with 25 g of polyethylene glycol): weight-average molecular weight: $1.329 \times 10^4$ Da; and coefficient of dispersion: 1.13;

dextrin 6 (when added with 30 g of polyethylene glycol): weight-average molecular weight: $1.281 \times 10^4$ Da; and coefficient of dispersion: 1.18;

dextrin 7 (when added with 35 g of polyethylene glycol): weight-average molecular weight: $8.029 \times 10^3$ Da; and coefficient of dispersion: 1.19;

dextrin 8 (when added with 40 g of polyethylene glycol): weight-average molecular weight: $6.081 \times 10^3$ Da; and coefficient of dispersion: 1.17;

dextrin 9 (when added with 45 g of polyethylene glycol): weight-average molecular weight: $5.584 \times 10^3$ Da; and coefficient of dispersion: 1.17;

dextrin 10 (when added with 50 g of polyethylene glycol): weight-average molecular weight: $5.561 \times 10^3$ Da; and coefficient of dispersion: 1.21; and dextrin 11 (when added with 60 g of polyethylene glycol): weight-average molecular weight: $5.443 \times 10^3$ Da; and coefficient of dispersion: 1.38.

Embodiment 2

15 g of tapioca starch was dispersed in 100 mL of n-butyl alcohol (analytically pure), added with 1 mL of concentrated hydrochloric acid (analytically pure), hydrolyzed for 72 h at 40° C., added with 14 mL of 1M NaHCO3 to terminate the reaction, centrifuged for 15 min at 4000 g, precipitated, washed with 50% ethanol solution for several times until there was no chloride ion, and dried for 24 h in an oven at 40° C. to obtain the dextrin. The dextrin was heated and dissolved in the distilled water to prepare a dextrin solution at a concentration of 0.9%. 5 g of polyethylene glycol (analytically pure) having a number-average molecular weight of 4000 Da was added to 100 mL of dextrin solution, stirred while heating until the polyethylene glycol was dissolved, that is, the solution became clear, naturally cooled in air to 25° C., remained at 25° C. in a water bath for 24 h, and centrifuged for 15 min at 4000 g; the obtained precipitate was washed with trichloromethane to remove the residual polyethylene glycol, dried for 24 h at 40° C., crushed and sieved to obtain a dextrin component Grade 1; 5 g of polyethylene glycol was continuously added to the supernatant, and the above processes were repeated until the amount of polyethylene glycol added reached 60 g, thus to obtain 9 graded dextrin components. The dextrin products were analyzed by high-efficiency exclusion chromatography by a multi-angle laser detector and a differential detector. The respective molecular weight of the 9 dextrin components is shown as follows:

Dextrin 1 (when added with 15 g of polyethylene glycol): weight-average molecular weight: $3.297 \times 10^4$ Da; and coefficient of dispersion: 1.34;

Dextrin 2 (when added with 20 g of polyethylene glycol): weight-average molecular weight: $1.141 \times 10^4$ Da; and coefficient of dispersion: 1.17;

Dextrin 3 (when added with 25 g of polyethylene glycol): weight-average molecular weight: $9.235 \times 10^3$ Da; and coefficient of dispersion: 1.24;

Dextrin 4 (when added with 30 g of polyethylene glycol): weight-average molecular weight: $1.066 \times 10^4$ Da; and coefficient of dispersion: 1.09;

dextrin 5 (when added with 40 g of polyethylene glycol): weight-average molecular weight: $9.386 \times 10^3$ Da; and coefficient of dispersion: 1.17;

Dextrin 6 (when added with 45 g of polyethylene glycol): weight-average molecular weight: $8.992 \times 10^3$ Da; and coefficient of dispersion: 1.18;

weight-average molecular weight: $7.987 \times 10 \times 3$ Da; and coefficient of dispersion: 1.28;

Dextrin 8 (when added with 55 g of polyethylene glycol): weight-average molecular weight: $7.786 \times 10^3$ Da; and coefficient of dispersion: 1.15;

Dextrin 9 (when added with 60 g of polyethylene glycol): weight-average molecular weight: $6.381 \times 10^3$ Da; and coefficient of dispersion: 1.47.

The invention claimed is:

1. A method for fractionating dextrin, comprising a dextrin solution preparation step and a dextrin fractionating step which employs stepwise precipitation by polyethylene glycol, specifically: adding 5 g of polyethylene glycol to 100 mL of dextrin solution at a mass concentration of 0.9%-3.6%, stirring while heating until the polyethylene glycol is dissolved, that is, the solution becomes clear, naturally cooling in air to 25° C., remaining at 25° C. in a water bath for 24 h, centrifuging for 15 min at 4000 g if any precipitation occurs, washing the obtained precipitate with trichloromethane to remove the residual polyethylene glycol, drying for 24 h at 40° C., crushing and sieving to obtain a dextrin component Grade 1; continuously adding 5 g of polyethylene glycol to the supernatant, and repeating the above processes to obtain a dextrin component Grade 2; if no precipitation occurs, continuously adding 5 g of polyethylene glycol until the precipitation occurs; and repeating the above processes until the amount of polyethylene glycol added reaches 60 g, thus to obtain 9 to 11 graded dextrin components.

2. The method for fractionating dextrin according to claim 1, characterized in that the dextrin is obtained by the degradation of starch with alcohol-acid, specifically: dispersing 15-25 g of tapioca starch in 100 mL of n-butyl alcohol, adding 1 mL of concentrated hydrochloric acid, hydrolyzing for 3 days at 40° C., adding 14 mL of 1M $NaHCO_3$ to terminate the reaction, centrifuging for 15 min at 4000 g, precipitating, washing with 50% ethanol solution for several times until there is no chloride ion, drying in an oven at 40° C., crushing, and sieving to obtain the dextrin.

3. The method for fractionating dextrin according to claim 1, characterized in that the number-average molecular weight of the used polyethylene glycol is 4000 Da, 6000 Da or 8000 Da.

* * * * *